United States Patent
Egger et al.

(10) Patent No.: US 9,262,162 B2
(45) Date of Patent: Feb. 16, 2016

(54) REGISTER FILE AND COMPUTING DEVICE USING THE SAME

(75) Inventors: Bernhard Egger, Seoul (KR); Dong-Hoon Yoo, Seoul (KR); Won-Sub Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 13/206,163

(22) Filed: Aug. 9, 2011

(65) Prior Publication Data

US 2012/0159114 A1    Jun. 21, 2012

(30) Foreign Application Priority Data

Dec. 17, 2010    (KR) .................. 10-2010-0130251

(51) Int. Cl.
*G06F 12/00*    (2006.01)
*G06F 9/30*    (2006.01)
*G06F 13/00*    (2006.01)
*G06F 13/28*    (2006.01)
*G06F 9/50*    (2006.01)

(52) U.S. Cl.
CPC .......... *G06F 9/3012* (2013.01); *G06F 9/30098* (2013.01); *G06F 9/30123* (2013.01); *G06F 9/5077* (2013.01)

(58) Field of Classification Search
CPC . G06F 9/5077; G06F 9/30098; G06F 9/3012; G06F 9/30123
USPC ....................................... 711/203, 1
See application file for complete search history.

(56) References Cited

U.S. PATENT DOCUMENTS

| 5,659,700 | A | * | 8/1997 | Chen et al. ..................... 711/217 |
| 5,913,049 | A | * | 6/1999 | Shiell et al. .................... 712/215 |
| 5,940,466 | A |   | 8/1999 | Brunelle |
| 5,960,212 | A |   | 9/1999 | Mak |
| 5,960,466 | A | * | 9/1999 | Belgard ......................... 711/213 |
| 6,195,746 | B1 |   | 2/2001 | Nair |
| 6,757,807 | B1 |   | 6/2004 | Jacobson et al. |
| 7,487,505 | B2 |   | 2/2009 | Rosenbluth et al. |
| 2002/0156990 | A1 | * | 10/2002 | Chen ............................. 711/219 |
| 2003/0041228 | A1 | * | 2/2003 | Rosenbluth et al. .......... 712/220 |
| 2008/0184007 | A1 |   | 7/2008 | Codrescu et al. |
| 2009/0089817 | A1 |   | 4/2009 | Bybell |
| 2009/0100249 | A1 |   | 4/2009 | Eichenberger et al. |

(Continued)

FOREIGN PATENT DOCUMENTS

CN    1547695 A    11/2004
KR    10-2007-0097024    10/2007

(Continued)

OTHER PUBLICATIONS

European Patent Office Search Report issued on Apr. 5, 2012 in counterpart European Patent Application No. 11193767.8 (9 pages, in English).

(Continued)

*Primary Examiner* — Mark Giardino, Jr.
(74) *Attorney, Agent, or Firm* — NSIP Law

(57) ABSTRACT

A register file is provided. The register file includes a plurality of registers configured to form at least one register cluster, each of the registers being configured to have a virtual index defined for each cluster and a physical index defined for each register, and an index converting unit configured to convert the virtual index to the physical index.

20 Claims, 5 Drawing Sheets

(56) References Cited

U.S. PATENT DOCUMENTS

| | | |
|---|---|---|
| 2009/0276432 A1 | 11/2009 | Hokenek et al. |
| 2011/0161616 A1* | 6/2011 | Tarjan et al. .................. 711/170 |

FOREIGN PATENT DOCUMENTS

| | | |
|---|---|---|
| KR | 10-2009-0042294 | 4/2009 |
| WO | WO 00/33178 | 6/2000 |
| WO | WO 00/33184 | 6/2000 |

OTHER PUBLICATIONS

Chinese Office Action issued on Apr. 1, 2015 in counterpart Chinese Application No. 201110425956.2 (19 pages in Chinese with English translation).

* cited by examiner

REGISTER FILE AND COMPUTING DEVICE USING THE SAME

CROSS-REFERENCE TO RELATED APPLICATION(S)

This application claims the benefit under 35 U.S.C. §119(a) of Korean Patent Application No. 10-2010-0130251, filed on Dec. 17, 2010, in the Korean Intellectual Property Office, the entire disclosure of which is incorporated herein by reference for all purposes.

BACKGROUND

1. Field

The following description relates to a register file and computing device using the same.

2. Description of the Related Art

Reconfigurable architecture refers to architecture in which a hardware configuration of a computing device may be changed to optimally perform a task.

When a task is only processed in a hardware environment, it is difficult to efficiently process the task after the task's process is changed because of the fixed nature of hardware. In contrast, if a task is only processed in a software environment, the task can be processed by reconfiguring software to suit a process of the task, but processing speed of the task may be slower when processed in a software environment than when the task is processed in a hardware environment.

The reconfigurable architecture process tasks based on both hardware and software advantages. Recently, such reconfigurable architecture has drawn more attention from a digital signal processing field which executes the same task iteratively.

One of a variety of types of reconfigurable architecture is a coarse-grained array. The coarse-grained array includes a number of processing units. For the coarse-grained array, the number of processing units are adjusted to optimally perform a specific task.

In the coarse-grained array, a plurality of processing units are capable of processing different threads concurrently. For example, in the case of threads #0 and #1 which can be processed in parallel, processing unit #0 can process the thread #0 and processing unit #1 can process the thread #1. However, when the threads #0 and #1 refer to the same register, it is not possible to ensure effective multi-threading. In this case, when a programmer makes a code directly, or a compiler compiles a source code, threads need to be appropriately scheduled, which may cause overhead in a multi-thread system.

SUMMARY

In one general aspect, a register file is provided. The register file includes a plurality of registers configured to form at least one register cluster, each of the registers being configured to have a virtual index defined for each cluster and a physical index defined for each register, and an index converting unit configured to convert the virtual index to the physical index.

In another general aspect, a computing device is provided. The computing device includes a plurality of registers configured to form at least one register cluster, each of the registers being configured to have a virtual index defined for each cluster and a physical index defined for each register, an index converting unit configured to convert the virtual index to the physical index, and a plurality of function units configured to form at least one function unit cluster corresponding to the at least one register cluster, and to access the respective registers through the virtual index.

In another general aspect, a computing device is provided. The computing device includes a plurality of registers configured to form a first register cluster and a second register cluster, each of the registers being configured to have a virtual index defined for each cluster and a physical index defined for each register, a plurality of function units configured to form a first function unit cluster and a second function unit cluster, and to access the respective registers through the defined virtual index, a first offset storage configured to store a first offset corresponding to a default value, a second offset storage configured to store a second offset corresponding to the number of registers belonging to the first register cluster, a first converting unit configured to receive the virtual index from the first function unit cluster and convert the received virtual index to the physical index by adding the virtual index and the first offset, and a second converting unit configured to receive the virtual index from the second function unit cluster and convert the received virtual index to the physical index by adding the virtual index and the second offset.

Other features and aspects may be apparent from the following detailed description, the drawings, and the claims.

Figure 1:
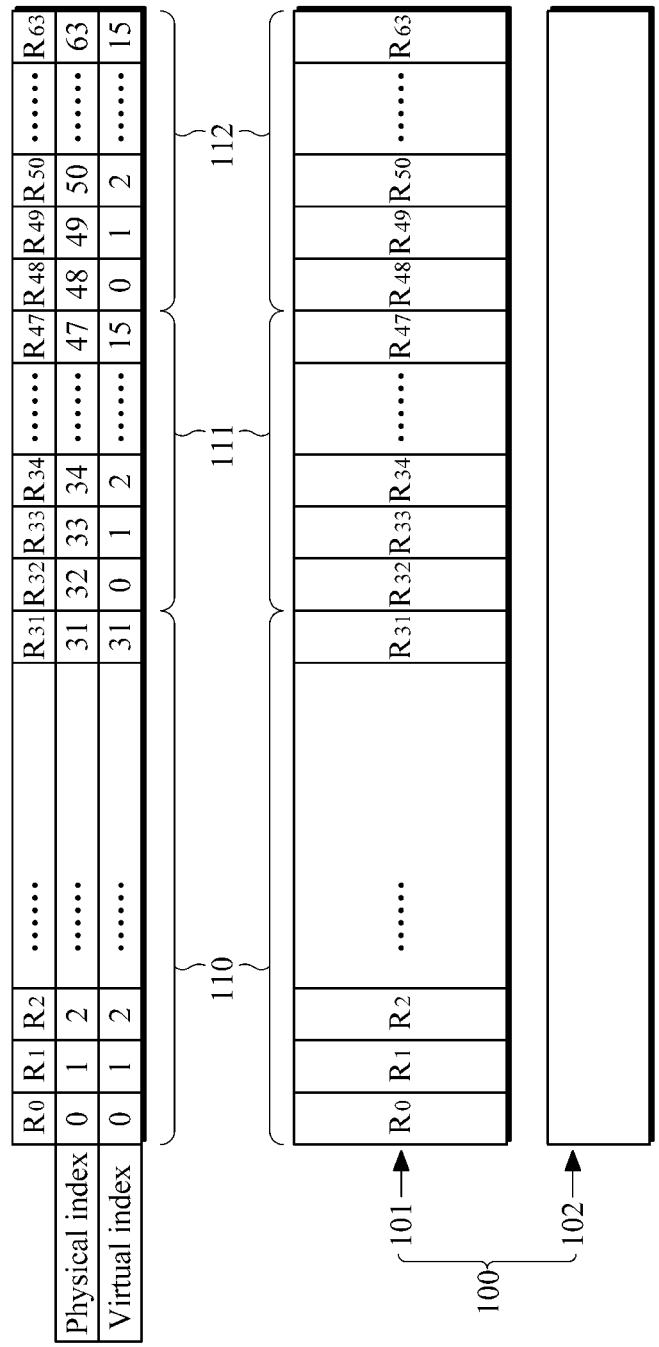
FIG. 1 is a diagram illustrating an example of a register file.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a register file.

Referring to the example illustrated in FIG. 1, the register file 100 may include a register unit 101 and an index converting unit 102.

The register unit 101 may include a plurality of registers. For example, the register unit 101 may include 64 registers R0 to R63.

The registers R0 to R63 may form one or more clusters. For example, registers R0 to R31 form cluster #0 110, registers R32 to R47 form cluster #1 111, and registers R48 to R63 form cluster #2 112.

Each of the registers R0 to R63 may have a physical index and a virtual index. The physical indices may correspond to physical locations or addresses of the respective registers R0 to R63. The physical indices may be allocated to the respective registers R0 to R63. The virtual indices may be allocated on a cluster basis. For example, the cluster #0 110 may be allocated virtual indices starting from 0 to 31, and the cluster #1 111 may be allocated virtual indices starting from 0 to 15, and the cluster #2 112 may be allocated virtual indices starting from 0 to 15.

The index converting unit 102 may convert a virtual index to a physical index. For example, thread #0 and thread #1 which may be concurrently processed use the cluster #0 110 and the cluster #1 111, respectively, and each of the thread #0 and the thread #1 accesses the registers R0 to R63.

If the thread #0 is going to write data in the register R2, the thread #0 may generate a virtual index '2.' In response to receiving the virtual index '2' from the thread #0, the index converting unit 102 may be able to convert the received virtual index '2' to a corresponding physical index '2' since the thread #0 corresponds to the cluster #0 110. Thus, the thread #0 may be allowed to access the register R2 through the virtual index '2.'

In addition, if the thread #1 is going to write data in the register R34, the thread #1 may also generate a virtual index '2.' In response to receiving the virtual index '2,' the index converting unit 102 may be enabled to convert the received virtual index '2' to a corresponding physical index '34' since the thread #1 corresponds to the cluster #1 111. Hence, the thread #1 may be allowed to access the register R34 through the virtual index '2.'

As described above, the register file 100 is allocated virtual indices on a cluster basis and each of the clusters is allowed to access the register through the virtual index, so that multi-thread can use a cluster register dynamically.

In another example, instead of 64 registers, 32 registers, 128 registers, or any other number of registers may be used.

Further, the number of formed clusters and the number of registers belonging to each cluster may vary according to the purpose of use and applications. For example, only one cluster may be formed by grouping all 64 registers into a single group, or 4 clusters may be formed by grouping every 16 registers into a group. The conversion or translation from a virtual index to a physical index may be performed with a simple procedure based on an appropriate offset value which is set according to the number of formed clusters and stored in the index converting unit 102.

The physical indices and the virtual indices may be represented by bit data. For example, in the case of 64 registers, each of the physical index and the virtual index may be represented by 6-bit data.

Moreover, if a size of each cluster (i.e., the number of registers belonging to each cluster) is different from each other, the clusters may be formed such that larger clusters are located earlier than smaller clusters. In other words, when a plurality of clusters with different sizes are formed, the clusters may be arranged according to their size and registers having smaller physical indices may be sequentially mapped to the clusters in the order starting from the largest cluster.

For example, in a case in which 64 registers is to be divided into three groups of registers, including one group of 32 registers and two groups of 16 registers, the registers R0 to R31 may be selected and mapped to the largest cluster.

Figure 2:
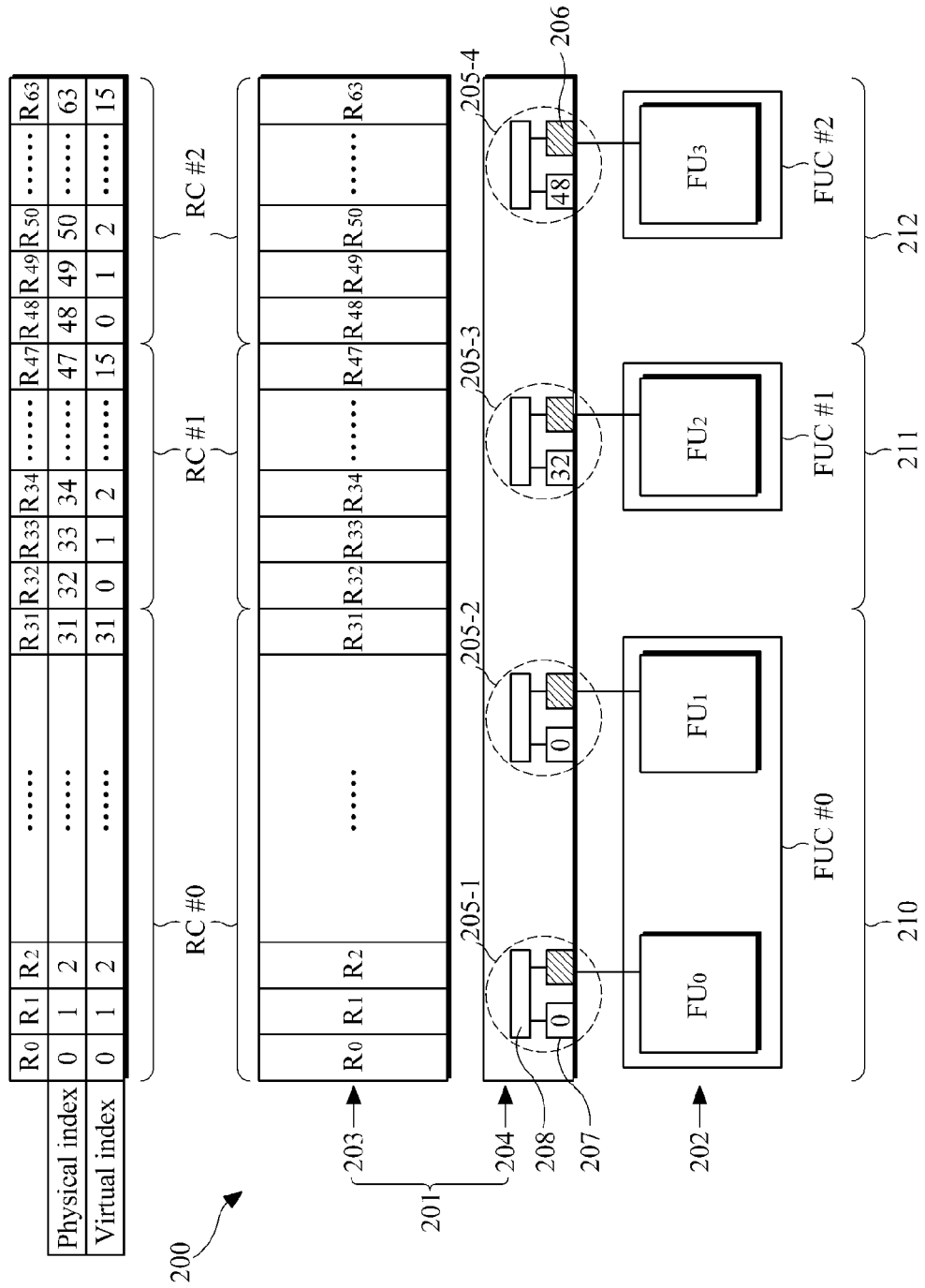
FIG. 2 is a diagram illustrating an example of a computing device.

FIG. 2 illustrates an example of a computing device.

Referring to the example illustrated in FIG. 2, the computing device 200 may include a register file 201 and a processing unit 202.

The register file 201 may use the register file 100 shown in the example illustrated in FIG. 1. For example, the register file 201 may include a register unit 203 and an index converting unit 204. The register unit 203 may include a plurality of registers R0 to R63. The registers R0 to R63 may form at least one cluster. Each of the registers R0 to R63 may include a physical index and a virtual index. The index converting unit 204 may include a plurality of index converting modules 205-1, 205-2, 205-3, and 205-4. Each of the index converting modules 205-1, 205-2, 205-3, and 205-4 will be described later.

The processing unit 202 may include a plurality of function units. For example, the processing unit 202 may be a reconfigurable array (CGA) including 4 to 16 function units. Each of the function units FU0 to FU3 may include an arithmetic/logic operation module to process a job (for example, a thread, a task, an instruction, etc.).

In addition, the function units FU0 to FU3 may form at least one cluster. In the example, a cluster formed by registers will be referred to as "RC" and a cluster formed by function units will be referred to as "FUC."

FUCs formed by the function units FU0 to FU3 may be paired with RCs formed by registers. For example, RC#0 includes registers R0 to R31 and FUC#0 includes function units FU0 and FU1 to form cluster #0 210. In addition, RC#1 includes registers R32 to R47 and FUC#1 includes function unit FU2 to form cluster #1 211, and RC#2 includes registers R48 to R63 and FUC#2 includes function unit FU3 to form cluster #2 212.

Hence, each of the function units FU0 to FU3 may concurrently process several jobs using registers belonging to the cluster allocated thereto. For example, the function unit FU0 may use the registers R0 to R31 to process thread #0, and the function unit FU2 may use the registers R32 to R47 to process thread #1. In this case, the threads #0 and #1 may be threads which can be processed in parallel.

Further, the threads #0 and #1 may be able to access the registers through virtual indices without the need for physical indices which may represent physical locations of the registers. For example, the index converting unit 204 may receive virtual indices from the respective function units FU0 to FU3, and convert the received virtual indices to physical indices.

The index converting unit 204 may include index converting modules 205-1, 205-2, 205-3, and 205-4. The index converting modules 205-1, 205-2, 205-3, and 205-4 may correspond to the respective function units FU0 to FU3. For example, the index converting modules 205-1, 205-2, 205-3, and 205-4 may be formed on address ports disposed between the register file 201 and the respective function units FU0 to FU3.

Each of the index converting modules 205-1, 205-2, 205-3, and 205-4 may include a virtual index receiving unit 206, an offset storage 207, and an index increasing unit 208.

The virtual index receiving unit 206 may receive virtual indices from the respective function units FU0 to FU3, and may be connected to an address port.

The offset storage 207 may store a value corresponding to a number of registers belonging to each of the clusters 210, 211, and 212. The offset storage 207 may accumulatively store the number of registers belonging to previous clusters. For example, the cluster #0 210 is the first cluster and thus there is no previous cluster. Hence, the offset storage 207 corresponding to the cluster #0 210 stores '0.' The cluster #1 211 is the second cluster and a previous cluster is the cluster #0 210, and thus the offset storage 207 corresponding to the cluster #1 211 stores '32' which is the number of the registers belonging to the cluster #0 210. In similar manner, the offset storage 207 corresponding to the cluster #2 stores '48' which is the accumulated number of the registers belonging to the clusters #0 210 and #1 211.

The index increasing unit 208 may increase the virtual indices received from the virtual index receiving unit 206 by the number corresponding to the offset stored in the offset storage 207. In a case in which the virtual indices and the offsets are represented by bit data, the index increasing unit 208 may be an OR operation device.

In an example, if the function unit FU2 belonging to the cluster #1 211 generates a virtual index '5,' the index converting module 205-3 belonging to the cluster #1 211 may receive the virtual index '5' from the function unit FU2. Then, the index converting module 205-3 may generate a physical index '37' by adding an offset '32' and the virtual index '5.' Accordingly, the function unit FU2 is enabled to access the register R37 through the virtual index '5.'

In another example, if the function unit FU0 belonging to the cluster #0 generates a virtual index '5,' the index converting module 205-1 may receive the virtual index '5' from the function unit FU0. Then, the index converting module 205-1 may generate a physical index '5' by adding an offset '0' and the virtual index '5.' Thus, the function unit FU0 is enabled to access the register R5 through the virtual index '5.'

In the above two example, even when the function unit FU0 and the function unit FU2 use the same virtual index '5,' different registers are accessed thereto according to the clusters to which the function units belong to. Hence, the registers R0 to R63 may be allowed to be dynamically clustered without intervention of a programmer or a complier.

In addition, a method of clustering may vary according to purpose of use and applications, and the computing device may further include an offset information memory (not illustrated) which stores offset information on the basis of each type of cluster.

Figure 3:
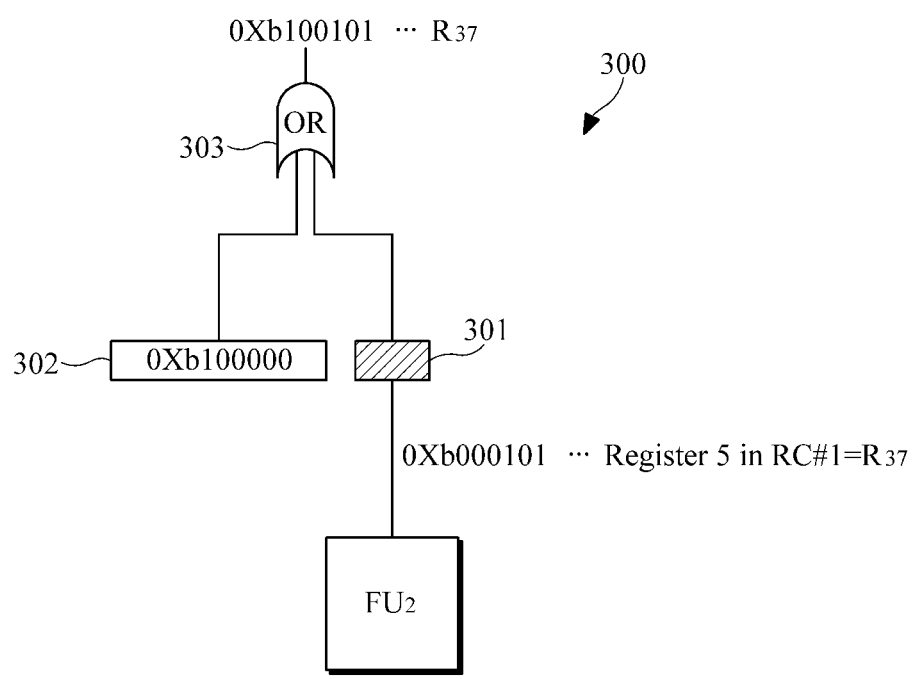
FIG. 3 is a diagram illustrating an example of an index converting module.

FIG. 3 illustrates an example of an index converting module.

Referring to the example illustrated in FIG. 3, an index converting unit 300 may include a virtual index receiving unit 301, an offset storage 302, and an OR operator 303.

The virtual index receiving unit 301 may be connected to an address port of a register file and may be configured to receive a virtual index. For example, the virtual index receiving unit 301 may receive a virtual index '0xb000101' from a function unit FU2 belonging to cluster #1.

The offset storage 302 may store the accumulated number of registers belonging to previous clusters. For example, the offset storage 302 belonging to the cluster #1 may store '0xb100000' that corresponds to the number of the registers belonging to the cluster #0.

The OR operator 303 may perform an OR operation on the virtual index and the offset. For example, the OR operator 303 may perform the OR operation on the virtual index '0xb000101' and the offset '0xb100000' to generate a physical index '0xb100101.'

Figure 4:
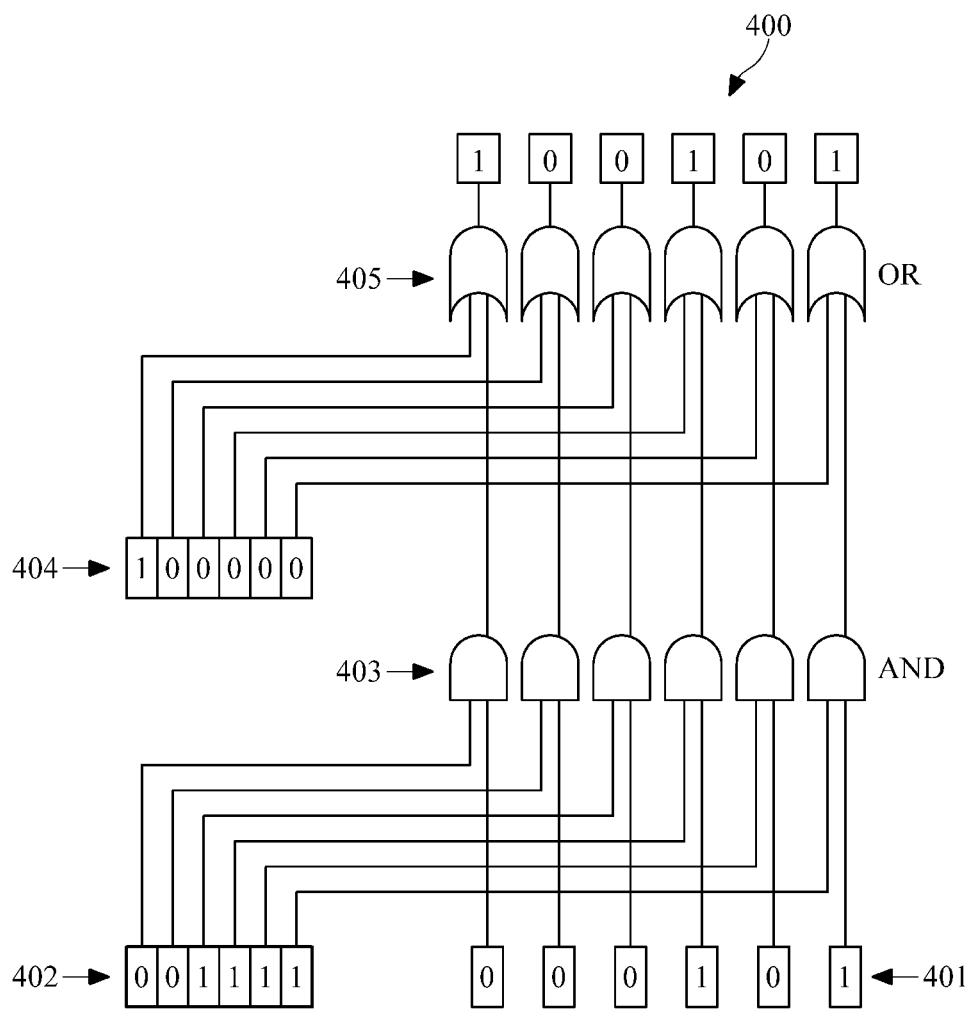
FIG. 4 is a diagram illustrating another example of an index converting module.

FIG. 4 illustrates another example of an index converting module.

Referring to the example illustrated in FIG. 4, an index converting unit 400 may include a virtual index receiving unit 401, a mask storage 402, an AND operator 403, an offset storage 404, and an OR operator 405.

The virtual index receiving unit 401 may be connected to an address port of a register file and may be configured to receive a virtual index. For example, the virtual index receiving unit 401 may receive a virtual index '0xb000101' from a function unit FU2 belonging to cluster #1.

The mask storage 402 may store a mask value for verifying a bit number of a virtual index. For example, in the case of the cluster #1, at least 4 bits are required to represent a virtual address of 16 registers, and thus a mask value may be set to '0xb001111.'

The AND operator 403 may perform an AND operation on the virtual index and the mask value. If a virtual index is normal, an output from the AND operator 403 is the same as the virtual index.

The offset storage 404 may store the accumulated number of registers belonging to previous clusters. For example, the offset storage 404 belonging to the cluster #1 may store '0xb100000' that indicates the number of registers belonging to the cluster #0.

The OR operator 405 may perform an OR operation on an output from the AND operator 403 and the offset. For example, the OR operator may perform an OR operation on '0xb000101' which is an output from the AND operator 403 and the offset '0xb100000' to generate a physical index '0xb100101.'

Figure 5:
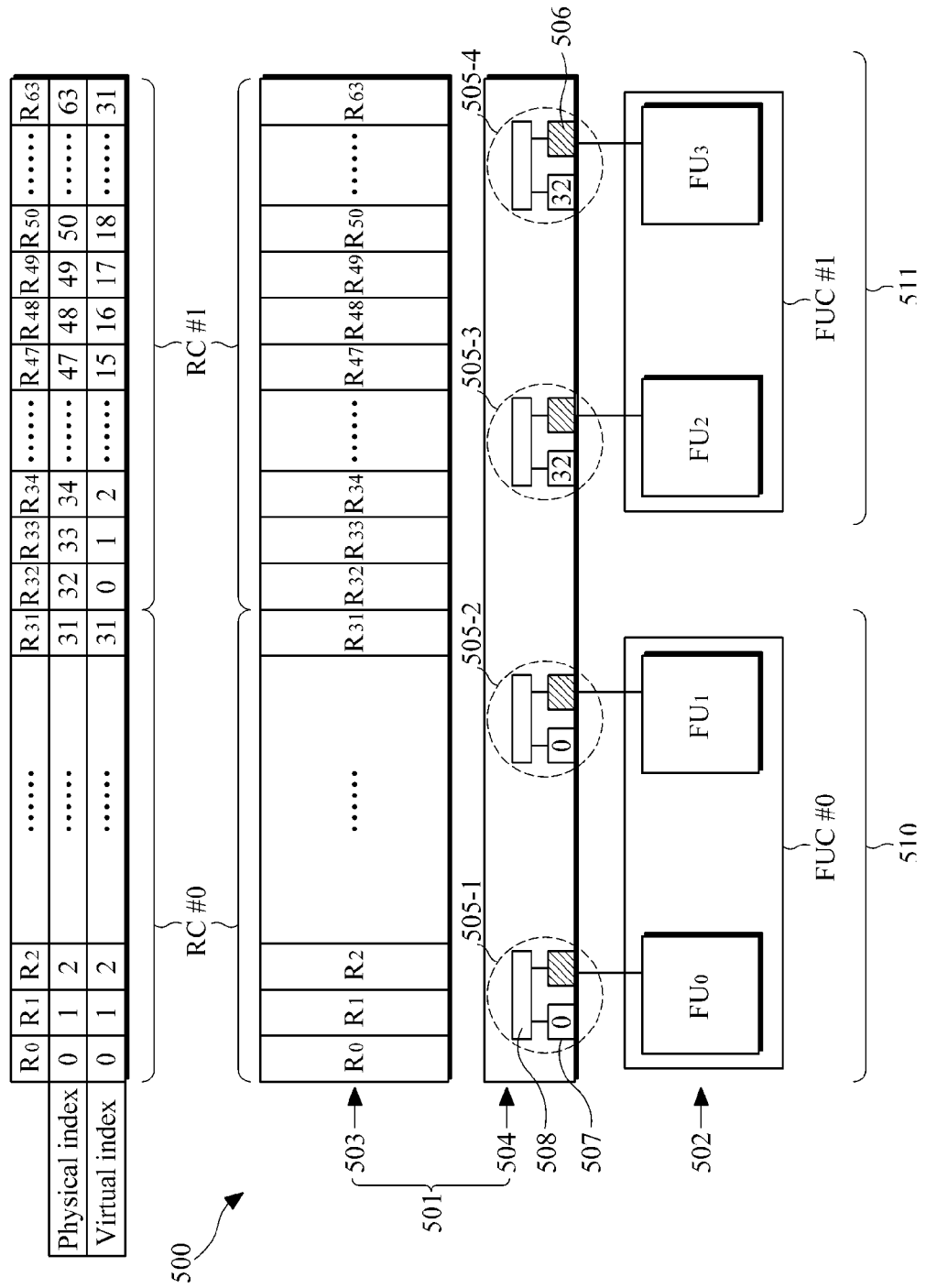
FIG. 5 is a diagram illustrating another example of a computing device.

FIG. 5 illustrates another example of a computing device.

Referring to the example illustrated in FIG. 5, the computing device 500 may include a register file 501 and a processing unit 502. The register file 501 and the processing unit 502 are the same as those shown in the example illustrated in FIG. 2, and thus the detailed description thereof will not be reiterated.

Unlike the computing device 200 shown in FIG. 2, the computing device 500 may form two clusters. For example, RC#0 may include registers R0 to R31 and FUC#0 including function units FU0 and FU1 may form cluster #0 510, and RC#1 may include registers R32 to R63 and FUC#1 including function units FU2 and FU3 may form cluster #1 511.

Thus, index converting modules 505-1 and 505-2 belonging to the cluster #0 may have an offset '0' set therefor, and index converting modules 505-3 and 505-4 belonging to the cluster #1 may have an offset '32' set therefor.

In a comparison between the examples shown in FIGS. 2 and 5, it may be understood that the example illustrated in FIG. 2 indicates a 2-1-1 cluster mode and the example illustrated in FIG. 5 indicates a 2-2 cluster mode. As described above, the computing device may offer various cluster modes, and according to a cluster mode, a number of registers may be allocated a virtual index on a cluster basis, and the virtual index is appropriately translated to a physical index, so that multi-thread can be effectively processed based on a cluster register.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As one example or implementation in which the desired result may be achieved, if some registers form a number of clusters, virtual indices are allocated to the respective clusters. The virtual index is converted into a physical index based on an appropriate offset. Thus, the register file can be used with or without being clustered according to the purpose of use.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A register file comprising:
   registers configured to form at least one register cluster, each of the registers being configured to have a virtual index allocated to a respective one of the at least one register cluster and a physical index; and
   an index converting unit configured to convert the virtual index, corresponding to the register that a thread writes data in, to the physical index based on the register cluster corresponding to the thread,
   wherein a number of the at least one register cluster is variable, and each of the at least one register cluster is reconfigurable to be used by only a respective one of at least one function unit cluster, wherein one or more function unit clusters among the at least one function unit cluster comprise function units allocated to a register cluster among the at least one register cluster, and wherein the function units in each of the one or more function unit clusters share a same register cluster among the at least one register cluster when processing a thread.

2. The register file of claim 1, wherein the index converting unit comprises:
   an offset storage configured to store an offset that is a number of the registers belonging to at least one previous register cluster of a register cluster corresponding to the offset storage; and
   an index increasing unit configured to add the virtual index and the offset.

3. The register file of claim 2, wherein the index increasing unit comprises an OR operator configured to perform an OR operation on the virtual index and the offset.

4. The register file of claim 1, wherein the index converting unit comprises:
   a mask storage configured to store a mask value corresponding to a number of bits needed to represent the virtual index; and
   an AND operator configured to perform an AND operation on the virtual index and the mask value.

5. The register file of claim 1, wherein the index converting unit is connected to each address port of the register file.

6. The register file of claim 1, wherein the index converting unit is implemented by a processor.

7. The register file of claim 1, wherein a number of the registers that forms each of the at least one register cluster is variable.

8. The register file of claim 1, wherein the registers are configured to be reconfigurable to form at least one other register cluster.

9. A computing device comprising:
   registers configured to form at least one register cluster, each of the registers being configured to have a virtual index allocated to a respective one of the at least one register cluster and a physical index;
   an index converting unit configured to convert the virtual index, corresponding to the register that a thread writes data in, to the physical index based on the register cluster corresponding to the thread; and
   function units configured to form at least one function unit cluster, and access the respective registers through the virtual index, each of the at least one function unit cluster being configured to use only a respective one of the at least one register cluster,
   wherein the computing device is configured to vary a number of the at least one register cluster, and reconfigure each of the at least one register cluster to be used by only a respective one of the at least one function unit cluster,
   wherein one or more function unit clusters among the at least one function unit cluster comprise function units allocated to a register cluster among the at least one register cluster, and wherein the function units in each of the one or more unction unit clusters share a same resister cluster among the at least one resister cluster when processing a thread.

10. The computing device of claim 9, wherein the index converting unit comprises:
    an offset storage configured to store an offset that is a number of the registers belonging to at least one previous register cluster of a register cluster corresponding to the offset storage; and
    an index increasing unit configured to add the virtual index and the offset.

11. The computing device of claim 10, wherein the index increasing unit comprises an OR operator configured to perform an OR operation on the virtual index and the offset.

12. The computing device of claim 9, wherein the index converting unit comprises:
    a mask storage configured to store a mask value corresponding to a number of bits needed to represent the virtual index; and
    an AND operator configured to perform an AND operation on the virtual index and the mask value.

13. The computing device of claim 9, wherein the index converting unit is connected to each address port of a register file comprising the registers.

14. The computing device of claim 9, wherein the index converting unit is implemented by a processor.

15. The computing device of claim 9, wherein the computing device is configured to allocate another virtual index to each of the registers based on the varied number of the at least one register cluster.

16. The computing device of claim 9, wherein the computing device is configured to vary a number of the at least one function unit cluster, and vary the number of the at least one register cluster to be the same as the varied number of the corresponding at least one function unit cluster.

17. A computing device comprising:
    registers configured to form at least one register cluster comprising a first register cluster and a second register cluster, each of the registers being configured to have a virtual index allocated to a respective one of the at least one register cluster and a physical index;

function units configured to form at least one function unit cluster comprising a first function unit cluster and a second function unit cluster, and access the respective registers through the virtual index, each of the at least one function unit cluster being configured to use only a respective one of the at least one register cluster, wherein one or more function unit clusters among the at least one function unit cluster comprise function units allocated to a register duster among the at least one register cluster, and wherein the function units in each of the one or more function unit clusters share a same register cluster among the at least one register cluster when processing a thread;

a first offset storage configured to store a first offset that is a default value;

a second offset storage configured to store a second offset that is a number of the registers belonging to the first register cluster;

a first index converting module configured to receive the virtual index from the first function unit cluster, and convert the received virtual index to the physical index by adding the virtual index and the first offset; and a second index converting module configured to receive the virtual index from the second function unit cluster, and convert the received virtual index to the physical index by adding the virtual index and the second offset, wherein the computing device is configured to vary a number of the at least one register cluster, and reconfigure each of the at least one register cluster to be used by only one of the at least a respective one function unit cluster, wherein the first index converting module is configured to convert the virtual index, corresponding to the register that a first thread writes data in, to the physical index based on the register cluster corresponding to the first thread, and wherein the second index converting module configured to convert the virtual index, corresponding to the register that a second thread writes data in, to the physical index based on the register cluster corresponding to the second thread.

18. The computing device of claim 17, wherein:

the first index converting module is configured to perform an OR operation on the virtual index and the first offset; and the second index converting module is configured to perform an OR operation on the virtual index and the second offset.

19. The computing device of claim 17, wherein each of the first and second index converting modules is implemented by a processor.

20. The computing device of claim 17, wherein the computing device is configured to set the first and second offsets based on the varied number of the at least one register cluster.

\* \* \* \* \*